United States Patent [19]

Tsuya et al.

[11] Patent Number: 5,277,960
[45] Date of Patent: Jan. 11, 1994

[54] SUBSTRATE FOR MAGNETIC RECORDING MEDIUM AND PROCESS OF PRODUCING THE SAME

[76] Inventors: Noboru Tsuya, 3-13-11, Hachimanyama, Setagaya-ku, Tokyo; Toshiro Takahashi, 350-29, Ose-cho, Hamamatsu-shi, Shizuoka-ken, both of Japan

[21] Appl. No.: 872,167

[22] Filed: Apr. 22, 1992

[30] Foreign Application Priority Data

Apr. 22, 1991 [JP] Japan .................................. 3-118073

[51] Int. Cl.⁵ .......................... B32B 3/30; B32B 15/08
[52] U.S. Cl. ..................................... 428/119; 427/528; 427/531; 427/534; 428/172; 428/457; 428/469; 428/900
[58] Field of Search ............... 428/900, 64, 67, 457, 428/172, 119, 469, 120; 427/528, 531, 534

[56] References Cited

U.S. PATENT DOCUMENTS 5,047,274 9/1991 Tsuya et al. ................... 428/900 X

*Primary Examiner*—Thomas J. Herbert, Jr.
*Attorney, Agent, or Firm*—Oblon, Spivak, McClelland, Maier & Neustadt

[57] ABSTRACT

The first invention provides a substrate for a magnetic recording medium, which is prepared by forming a macro-concavo-convex pattern for improving CSS properties and a micro-concavo-convex pattern for improving magnetic properties on the surface, thereby preventing the degradation of the CSS properties brought by the enhancement in friction coefficient and the increase in the area of a protective layer of the medium in contact with a magnetic head, caused by the wearing of the protective layer of the medium.

The second invention provides a process of producing a substrate for a magnetic recording medium, which forms the above macro-concavo-convex pattern and micro-concavo-convex pattern in a uniform distribution at the same time.

The first invention utilizes, as the texture, protrusions 13P and 15P different in length from the substrate surface, the protrusions being prepared by packing at least two kinds of materials 13 and 15 differing in etching rate into alumite pores 14A and 14B, polishing and then etching.

The second process invention comprises the steps of packing the first material into alumite pores of an aluminum alloy by means of electrolytic deposition, packing the second material having an etching rate different from that of the first material by means of dipping method, polishing the resultant surface and etching the polished surface so as to make the respective protrusion lengths of the first and the second materials within the predetermined range.

18 Claims, 10 Drawing Sheets

SUBSTRATE FOR MAGNETIC RECORDING MEDIUM AND PROCESS OF PRODUCING THE SAME

BACKGROUND OF THE INVENTION

1. Field of the Invention

The present invention relates to a substrate for a magnetic recording medium improved by means of a chemical texture method and a process of producing the same.

2. Discussion of Background

Figure 4:
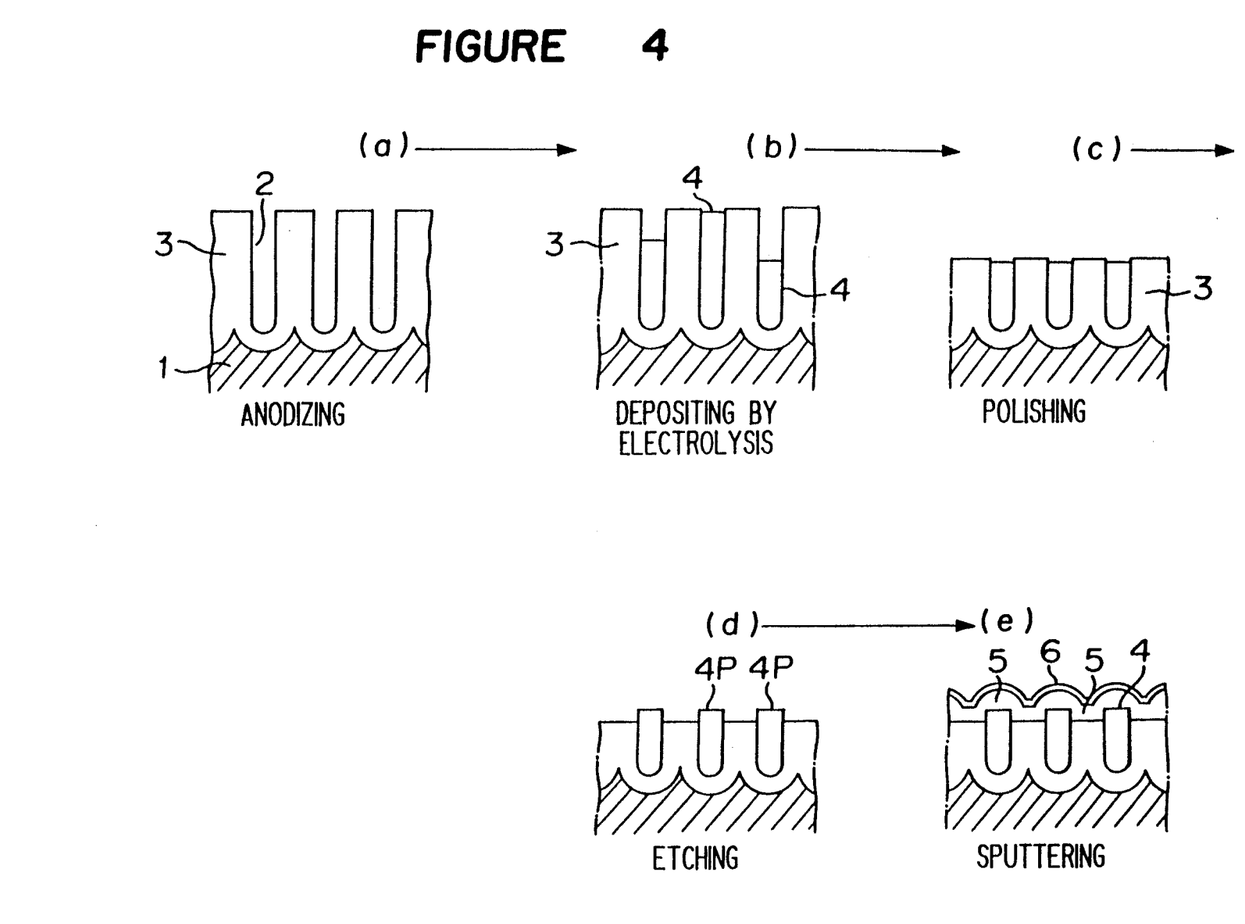
FIG. 4 illustrates the outline of the steps of the prior art CTX method.

Japanese Unexamined Patent Publication No. 165025/1989 discloses a chemical texture method (CTX method) as a method for forming a minute concavo-convex rough surface (texture) on a substrate for a magnetic recording medium. The CTX method is a method for remarkably improving not only magnetic properties of a magnetic film but also tribological properties of a substrate such as CSS properties and adsorption properties of a magnetic head onto a magnetic recording medium, which comprises (a) forming an alumite layer 3 having innumerable pores 2 on the surface by anodizing an aluminum or aluminium alloy substrate 1, (b) packing a material 4 having an etching rate different from the alumite into the pores of the alumite layer, (c) polishing the resultant substrate, (d) etching the polished substrate to form a minute concavo-convex pattern 4P on the alumite surface due to the above etching rate difference, and (e) forming a magnetic layer 5 and a protective layer 6 on the above treated surface, for example, by sputtering method, as shown in FIG. 4.

According to the above CTX method, since there are no protrusions protruded above the predetermined standard level, there are few head hits resulting in head crush and there is no fear that the protective layer 6 is cut by banishing step, thus providing a magnetic disk substrate having satisfactory CSS properties and corrosion resistance. The distance between pores 2 can be optionally adjusted, for example within a range of from 10 to 200 nm, by controlling anodizing voltage.

Recently, a high density magnetic recording medium using a Co-Pt type alloy as a magnetic layer has come to public notice. It is preferable for improving C/N properties to form the magnetic layer of this alloy in the vicinity of room temperature under a gas pressure range as high as possible (at least 10 mTorr). A graphite film containing diamond-like carbon used as a protective layer for this magnetic layer must be formed at a temperature as high as possible and under a pressure range as low as possible (lower than 5 mTorr). Otherwise, a protective layer having a satisfactory mechanical strength can not be formed but a soft carbon film rich in graphite structure is formed.

On the other hand, the texture obtained by the above known CTX method is too minute to the above-mentioned soft carbon film and the soft carbon film is worn when a magnetic head is in contact therewith during using the disk, thereby the concave part (valley) of the disk surface is rapidly buried with the worn carbon particles. Consequently, the area of the disk surface in contact with the magnetic head is increased, and accordingly the friction coefficient is enhanced, which results in poor CSS properties.

In order to solve the above-mentioned problems, it has been tried to reduce the packing rate of the electrolytic deposits into pores, but a satisfactory result has not been obtained.

SUMMARY OF THE INVENTION

The present invention has been conceived by taking the above-mentioned circumstances into consideration.

It is an object of the first invention to provide a substrate for a magnetic recording medium, which is prepared by forming a macro-concavo-convex pattern for improving CSS properties and a micro-concavo-convex pattern for improving magnetic properties on the surface, thereby preventing the degradation of CSS properties due to the enhancement in friction coefficient brought by the increase in the area of a protective layer of the medium in contact with a magnetic head caused by the wearing of a protective layer of the medium.

It is an object of the second invention to provide a process of producing a substrate for a magnetic recording medium, which forms the above macro-concavo-convex pattern and micro-concavo-convex pattern at the same time by simple steps.

DETAILED DESCRIPTION OF THE PREFERRED EMBODIMENTS

A substrate for a magnetic recording medium achieving the above object of the first invention is characterized by utilizing, as a texture, protrusions different in length from the substrate surface, of materials packed in pores of an anodized aluminum layer, said protrusions being formed by packing pores in the anodized aluminum layer with at least two materials differing in the etching rate, followed by polishing and then by etching.

The substrate for the magnetic recording medium is characterized by being treated in such a manner that the first material is packed in a group by electrolytic deposition into pores of the anodized aluminum layer of an aluminum alloy (for example, "AD-3" manufactured by Kobe Seiko K.K.; 99.9%; maximum size of inclusions of rapidly cooled alloy: 1 μm) used as the substrate, and that the second material is packed in a group by dipping method into the pores remained without being packed by the electrolytic deposition due to the presence of interposed materials (hereinafter referred to as "inclusions") in the aluminum alloy.

The etching is conducted so as to adjust the protrusion length of the first material group to from 5 to 20 nm and the protrusion length of the second material group to from 1 to 15 nm.

The process of producing the substrate in accordance with the second invention comprises the steps of (i) packing the first material into pores of the anodized aluminum layer of an aluminum alloy by electrolytic deposition, (ii) packing the remaining pores of the anodized aluminum layer of the aluminum alloy by dipping method with the second material having an etching rate different from that of the first material, (iii) polishing the surface, and (iv) etching the first and the second materials so as to obtain a predetermined protrusion length.

The first material packed by electrolytic deposition is selected from the group consisting of Cu, Sn and Zn, and the second material packed by dipping method is selected from the group consisting of an organic resin and an inorganic ceramic.

The alumite pores are quite uniformly distributed, and the distance between pores ranges from 10 to 200 nm depending on the anodizing voltage. The substrate has essentially very smooth surface since it is polished after packing at least two kinds of materials differing in the etching rate. Due to the difference in the etching rate, protrusions different in length from the substrate surface, i.e. macro-concavo-convex pattern and micro-concavo-convex pattern are formed. The macro-concavo-convex pattern improves CSS properties, while the micro-concavo-convex pattern improves magnetic properties.

When the first material is packed into the alumite pores of the aluminium alloy by means of electrolytic deposition, it is packed in a group into pores where interposed materials of the aluminium alloy are not present. On the other hand, when the second packing material is packed by means of dipping method, it is packed in a group into pores where the interposed materials are present. Since these packing materials are different in the etching rate, protrusions differing in length are formed in a group by etching. The group of the macro protrusions prevents the enhancement of the friction coefficient caused by damages and wearing by head hit.

When the protrusion length of the first material group is controlled to be from 5 to 20 nm and the protrusion length of the second material group is controlled to be from 1 to 15 nm, the friction coefficient of the disk becomes low and magnetic properties become satisfactory.

According to the second invention, the group packing of the first material and the group packing of the second material are quite uniformly conducted by two steps, and the substrate surface is made essentially smooth by polishing step, thereby preventing head crush. The macro-concavo-convex pattern and the micro-concavo-convex pattern can be formed at the same time by etching.

Now, the present invention will be described in further detail with reference to Examples. However, it should be understood that the present invention is by no means restricted to such specific Examples.

EXAMPLE 1

The example of the process of the present invention is illustrated on the basis of the drawings.

A) Alumite Treatment Step

Al Mg alloy solidified by forced cooling was used as an aluminium alloy substrate material, and was subjected to anodizing treatment in a 3% oxalic acid bath under an applied voltage of 50 V, thereby forming an alumite film having a pore diameter of 35 nm, a cell diameter of 110 nm and a film thickness of 10 μm.

B) Electrolytic Deposition Treatment Step

The substrate material thus alumite-treated was subjected to AC-electrolytic deposition treatment in a $CuSO_4$ bath, thereby depositing and packing Cu as the first material into pores under a barrier layer thickness of 22 nm. In this case, as illustrated in FIG. 1(a), since inclusions (intermetallic compound impurities) 12 were uniformly distributed in the aluminium alloy 11, Cu 13 was deposited and packed into pores 14A only where the inclusions 12 were not present, and therefore the pores 14B where the inclusions 12 were present, were remained vacant without being packed with Cu.

C) Dipping Step

Figure 1:
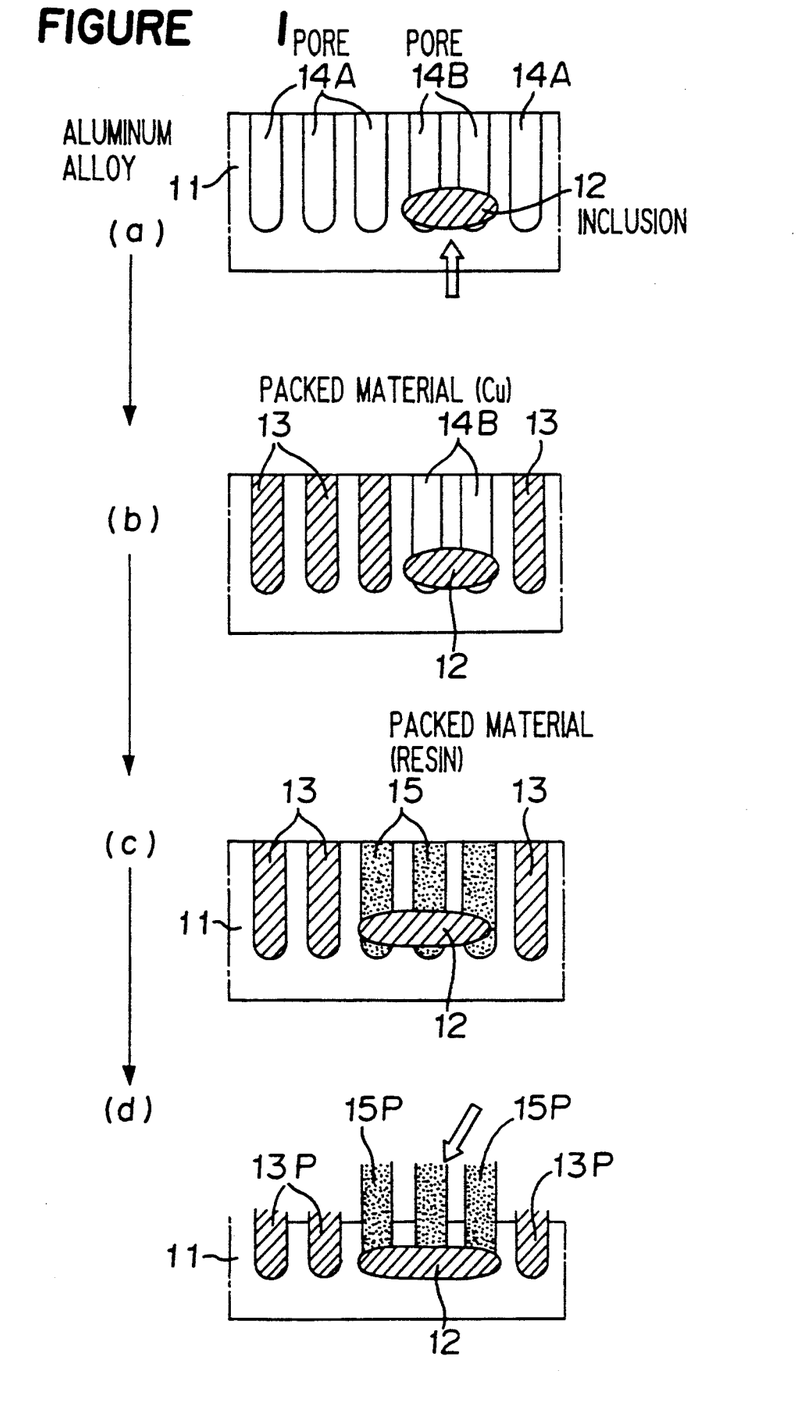
FIG. 1 illustrates the outline of the steps of the process of the present invention.

After drying the substrate having the pores partly packed with Cu by heat treatment at 300° C. in air for 1 hour, the dried substrate was dipped in a bath of, for example, "Si Alkoxide" or "Bismaleimide triazine Resin" manufactured by Mitsubishi Gas Kagaku K.K., thereby packing resin 15 as the second material into the vacant pores where Cu had not been packed as described in FIG. 1(c). The bismaleimide triazine (BT) resin is deposited by dipping the dried substrate in a bath of BT resin (for example, "BT3109" manufactured by Mitsubishi Gas Kagaku K.K. having a viscosity of 100 ps at 30° C.) and heating at 170° C. in air for 1 hour. The inorganic ceramic is deposited by dipping the dried substrate in a bath of, for example, 10% methanol solution of $Si_4O_3(OCH_3)_{10}$ and baking at 150° C. for 1 hour. Thereafter, the resultant substrate was dried at room temperature, and was heated at 300° C. to cure the resin. By this treatment, the resin was cured and the alkoxide was made $SiO_2$.

D) Polishing Step

The packing rate of the pores after the above electrolytic deposition step and the dipping step, was not always 100%, but was varied. Thus, since the substrate surface was not fully smooth, the substrate after packing treatment was subjected to polishing treatment using alumina particles having a particle size of 0.8 μm under pH 5 so as to reduce the thickness of the alumite film to 6 μm and to make the smoothness of the substrate surface to a degree of Ra 1.5 nm. The state of this substrate is not illustrated in the figures.

E) Etching Step

The substrate thus polished, was subjected to primary etching in a mixed liquor of phosphoric acid and chromic acid at 60° C. for 100 seconds, and was further subjected to secondary etching in oxalic acid for 5 seconds. The etching rate order of the primary etching is alumite>Cu>resin, and the etching rate order of the secondary etching is Cu>alumite>resin. Thus, the etching rate of the resin (SiO$_2$) is low.

As illustrated by FIG. 1(d), after the primary and the secondary etchings conducted under the above-mentioned etching rate conditions, a group of resin protrusions 15P were formed on the positions corresponding to the interposed materials 12 on the substrate surface, and a group of Cu protrusions 13P were formed on the positions where the interposed materials 12 were not present. The protrusion length of the resin protrusions 15P was 15 nm, while the protrusion length of the Cu protrusions 13P was 5 nm. Thus, a group of the resin protrusions formed a macro-concavo-convex pattern, while the group of the Cu protrusions formed a micro-concavo-convex pattern.

Figure 5:
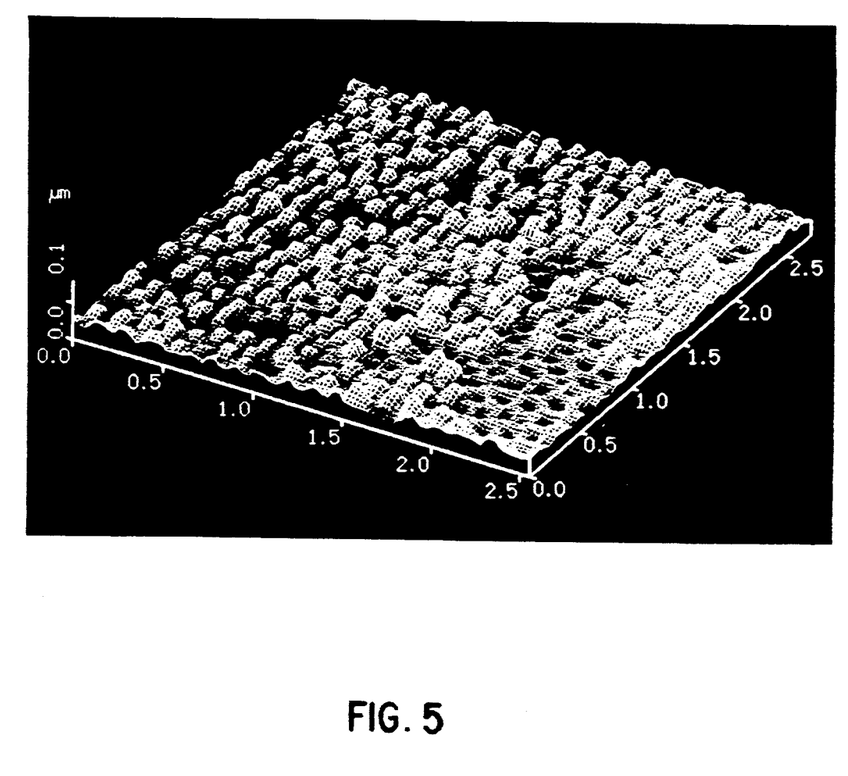
FIG. 5 is an STM photograph illustrating the metallographic structure of the metal surface of the magnetic disk substrate obtained after the sputtering step in accordance with the CTX method.
Figure 6:
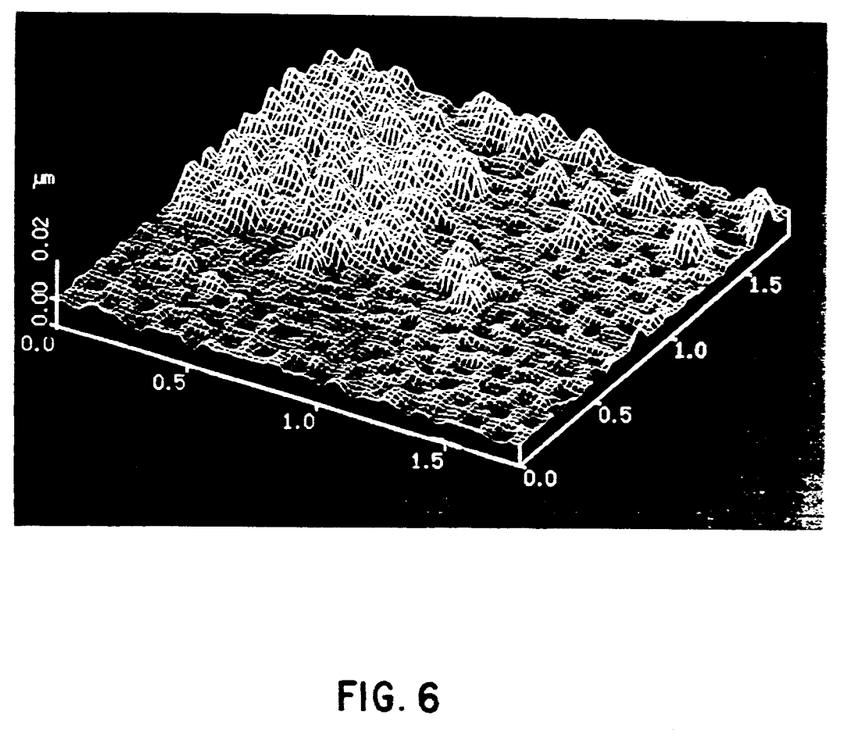
FIG. 6 is an STM photograph illustrating the metallographic structure of the metal surface of the magnetic disk substrate obtained after the sputtering step in accordance with the DCTX method.

Since the etching is doubly conducted, it is named as "Double Chemical Texture Method" (DCTX). FIG. 5 is an STM photograph illustrating the metallographic structure of the metal surface of the magnetic disk substrate obtained after sputtering by means of CTX method, while FIG. 6 is an STM photograph illustrating the metallographic structure of the metal surface of the magnetic disk substrate obtained after sputtering by means of DCTX method.

In the above-mentioned manner, the substrate for the magnetic recording medium of the present invention can be produced.

F) Sputtering Step

The following four types of magnetic disks were prepared by subjecting the substrates obtained respectively by the above-mentioned CTX method and DCTX method to in-line sputtering. That is, the two types of magnetic disks were prepared by sputtering firstly Cr and secondary Co-Pt so as to give film thicknesses of 100 nm and 40 nm at a substrate temperature of 50° C. in an Ar gas under a gas pressure of $15 \times 15^{-3}$ Torr, and finally coating a carbon layer of 30 nm thickness thereon as a protective layer. The remaining two types of magnetic disks were prepared in the same manner as above, except that the substrate temperature was made 250° C.

The above prepared magnetic disks were subjected to various tests to check the structures of the protective layers, magnetic properties and CSS properties.

(a) Analysis by Raman Spectrum

Figure 7:
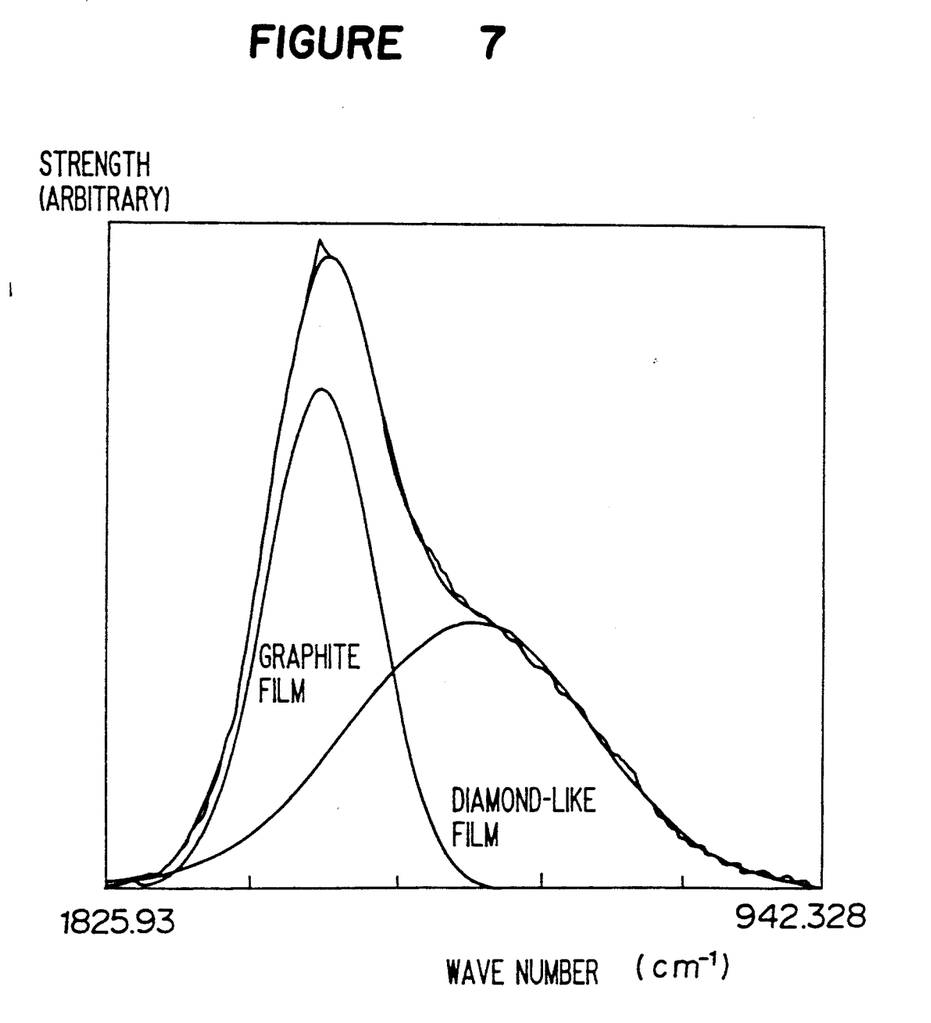
FIG. 7 illustrates Raman curves obtained at a substrate temperature of 50° C. under sputtering conditions.
Figure 8:
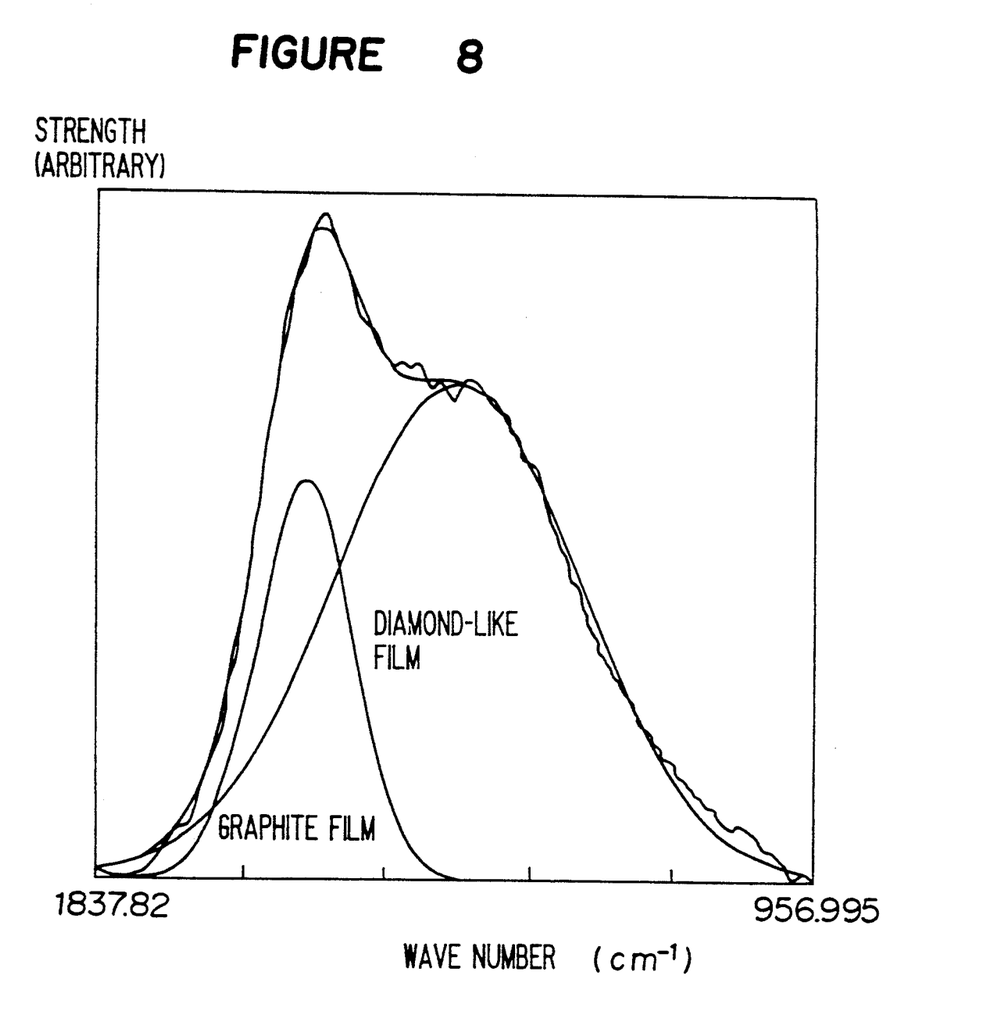
FIG. 8 illustrates Raman curves obtained at a substrate temperature of 250° C. under sputtering conditions.

FIGS. 7 and 8 respectively show Raman curves of carbon layers of the magnetic disks prepared at the substrate temperatures respectively of 50° C. and 250° C. As evident from the comparison of these figures, the carbon layer obtained at the higher substrate temperature is rich in diamond-like carbon of around 1,360 cm$^{-1}$, while the carbon layer obtained at the lower substrate temperature is not rich in diamond-like carbon.

(b) Magnetic properties

The magnetic head used in this test was an MIG head, and the gap between the head and the medium was 0.4 μm and the track width was 16 μm. The magnetic recording density (D50) was 50 KBPI, and C/N was 57.5 dB.

(c) CSS properties

Figure 9:
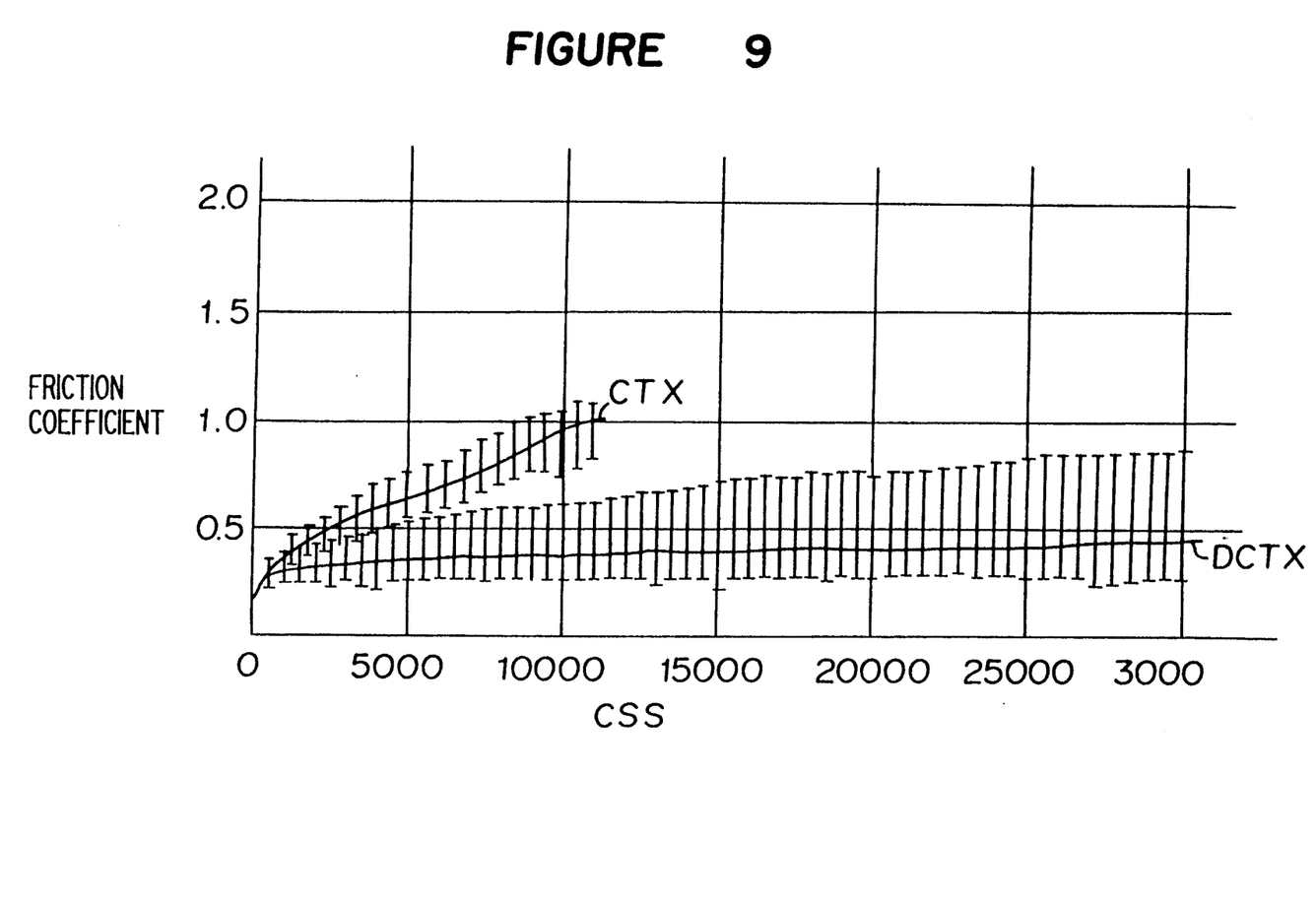
FIG. 9 illustrates a CSS property graph obtained at a substrate temperature of 50° C. under sputtering conditions.
Figure 10:
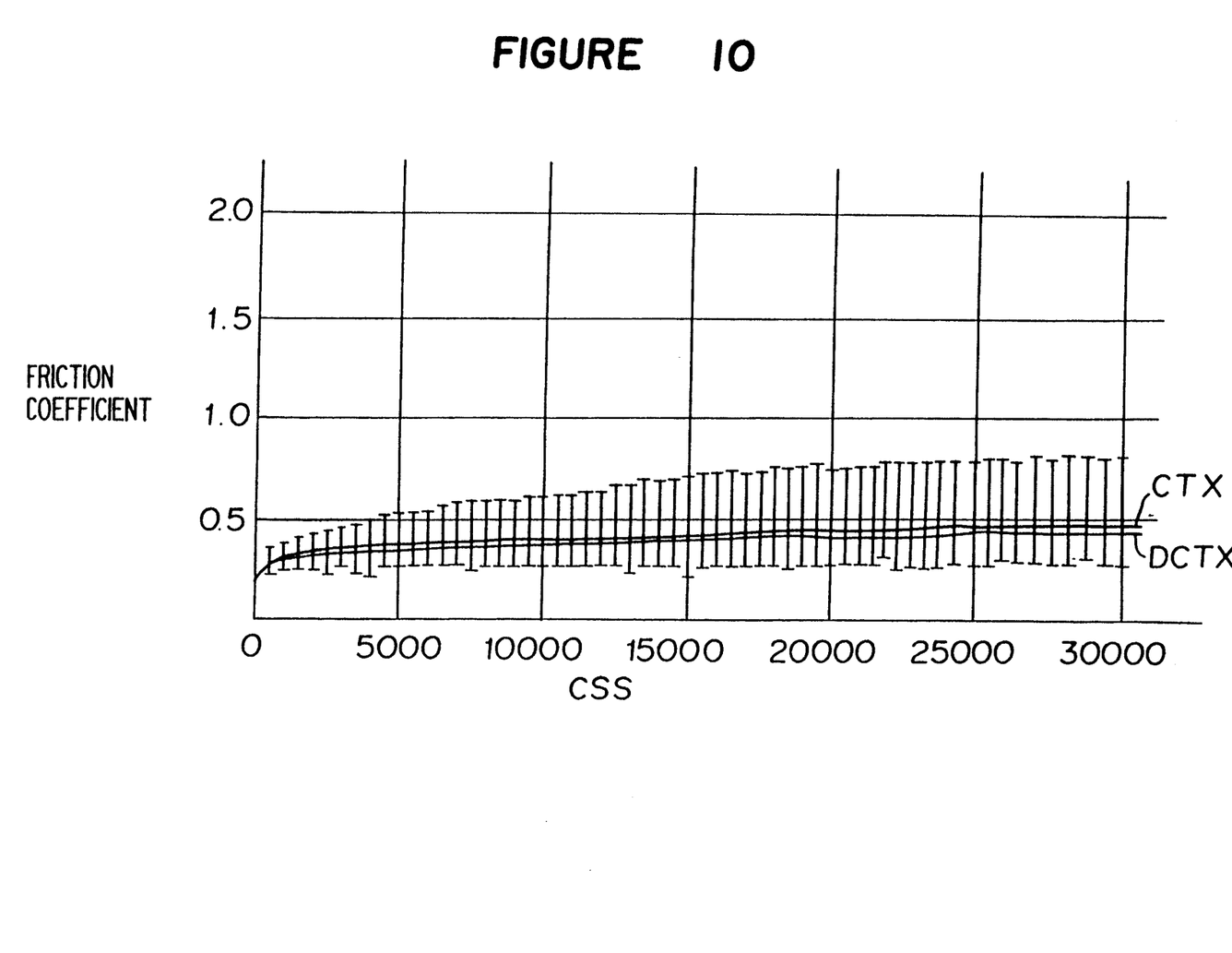
FIG. 10 illustrates a CSS property graph obtained at a substrate temperature of 250° C. under sputtering conditions.

FIG. 9 illustrates the CSS properties of the magnetic disks obtained at the substrate temperature of 50° C. under sputtering condition of $15 \times 15^{-3}$ Torr when the magnetic head load used in this test was 9.5 g, and FIG. 10 illustrates the CSS properties of the magnetic disks obtained at the substrate temperature of 250° C. A polarizable liquid (for example "FOMBLIN Z DOL" of perfluoro polymers) is coated in a thickness of 20 nm as a lubricant. The magnetic disk obtained by DCTX method had the maximum CSS times of 30,000 times and a friction coefficient of 0.6 regardless of the difference in the substrate temperature. On the other hand, the magnetic disk obtained by CTX method had almost the same maximum CSS times and friction coefficient as in the magnetic disk obtained by DCTX method when the substrate temperature was sufficiently high, but had the maximum CSS times of about 10,000 and a friction coefficient of 1.0 when the substrate temperature was low.

In summary, when the substrate temperature is sufficiently high, for example, around 250° C., the carbon layer formed becomes rich in diamond-like carbon which makes a strong carbon layer, thus CSS properties being not substantially different between the magnetic disk obtained by CTX method and the magnetic disk obtained by DCTX method. However, when the substrate temperature is low, for example, around 50° C., the carbon layer formed becomes poor in diamond-like carbon and makes a soft carbon layer. Consequently, the valleys of the fine concavo-convex patterns are easily buried, which results in the increase of a contact area, and accordingly, the friction coefficient of the magnetic disk obtained by CTX method becomes unfavorably high. On the other hand, the properties of the magnetic disk obtained by DCTX method do not vary regardless of the substrate temperature during production, and it is therefore understood that the texture of the magnetic disk obtained by DCTX method is excellent as compared with that of the magnetic disk obtained by CTX method.

OTHER EXAMPLES

Figure 2:
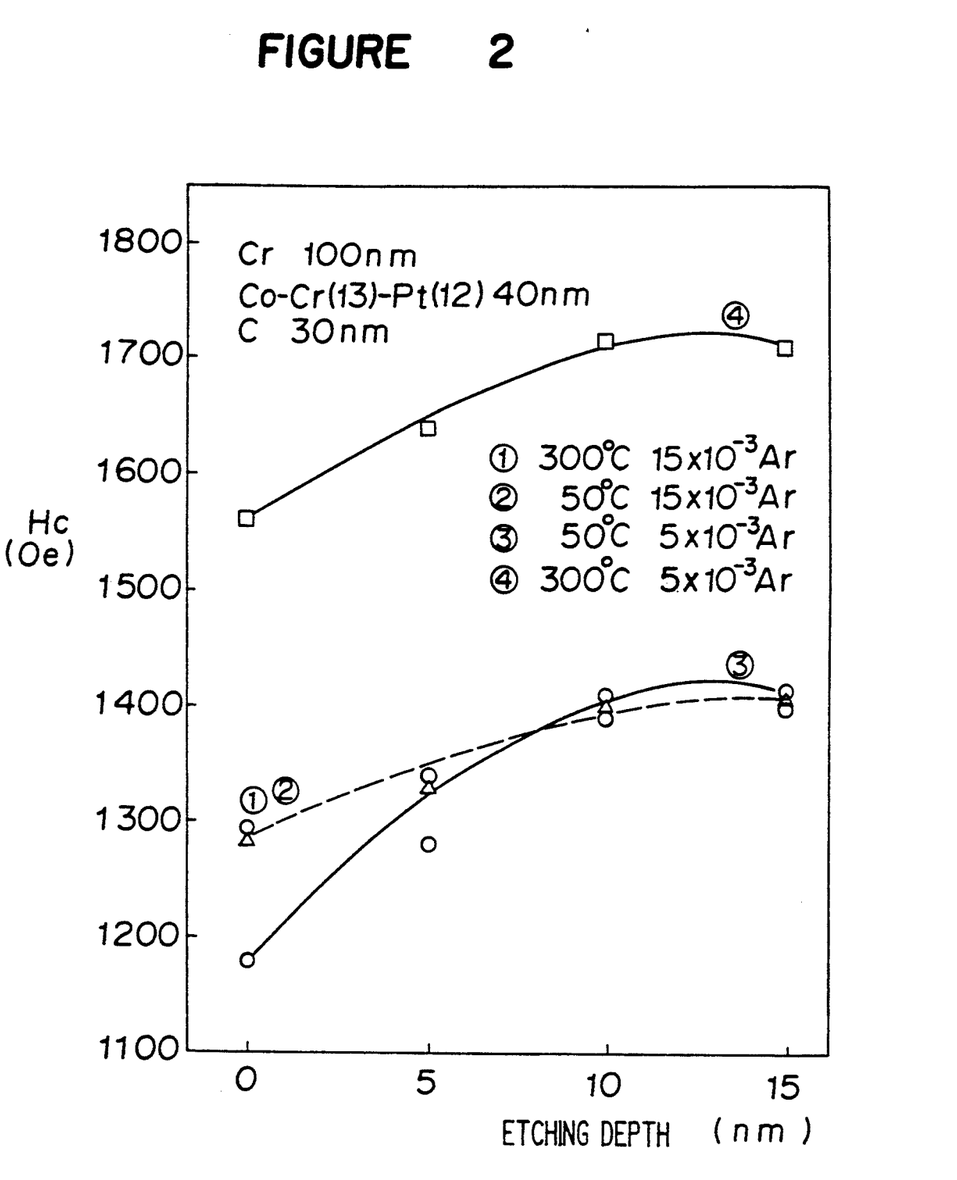
FIG. 2 shows graphs illustrating the relation between etching depth and coercive force under various sputtering conditions.

FIG. 2 shows graphs illustrating the relation between the etching depths of substrates obtained by DCTX method and the coercive force (Hc) of magnetic disks prepared by using the above substrates and varying sputtering conditions. The numerals and marks written on the right side of ① to ④ mean sputtering conditions including a substrate temperature, a gas pressure (Torr) and a gas used.

Figure 3:
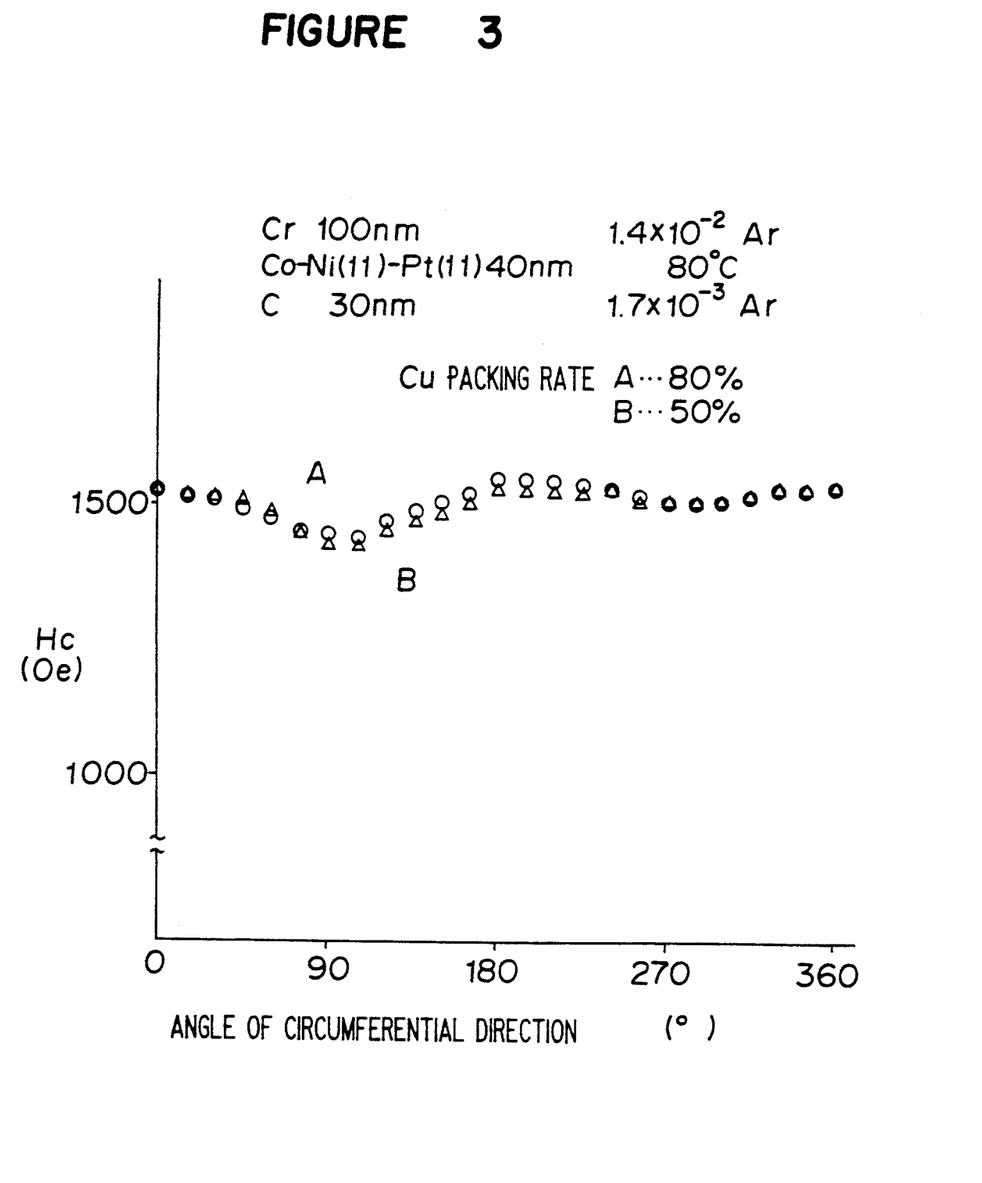
FIG. 3 shows graphs illustrating the distribution of coercive force in the circumferential direction of the magnetic disk of the example of the present invention.

FIG. 3 shows graphs illustrating the coercive force distribution in the circumferential direction with regard to the following two types of magnetic disks A and B. The magnetic disk A was prepared by subjecting a substrate having a Cu packing rate of 80% to in-line sputtering at a substrate temperature of 80° C. under an Ar gas pressure of $1.4 \times 10^{-2}$ Torr to form a Cr layer of 100 nm and a Co-Ni(II)-Pt(II) layer of 40 nm as magnetic layers, and finally forming a carbon protective layer of 30 nm at the same temperature under an Ar gas pressure of $1.7 \times 10^{-3}$ Torr. The magnetic disk B was prepared in the same manner as the magnetic disk, A, except that a substrate having a Cu packing rate of 50% was used.

As the results of magnetic property and CSS property tests with regard to these various examples, it was proved that a substrate having the first group protrusions (Cu) of a protrusion length ranging from 1 to 15 nm and the second group protrusions (resin) of a protrusion length ranging from 5 to 20 nm, is most suitable for a magnetic recording medium of high density recording and provides satisfactory magnetic properties and CSS properties.

Since the first material and the second material packed in alumite pores respectively have different etching rates, the difference in the protrusion length in the above-mentioned ranges can be made during etching treatment. As the packing materials, in addition to the above-mentioned Cu and resin, Sn, Zn, or the like can be used as the first material, and inorganic ceramics or the like can be used as the second material.

As mentioned above, the substrate for the magnetic recording medium of the present invention is characterized by utilizing, as the texture, protrusions different in length from the substrate surface, of materials packed in pores of an alumite layer, said protrusions being formed by packing pores in the alumite layer with at least two materials differing in the etching rate, followed by polishing and then by etching. Due to the presence of the macro-concave-convex pattern and the micro-concavo-convex pattern on the substrate surface, a magnetic disk prepared by forming a magnetic layer on this substrate of the present invention, provides more improved magnetic properties and CSS properties as compared with the conventional magnetic disk having the texture prepared by the known CTX method since the valleys (concave parts) of the texture of the disk of the present invention are not substantially buried with carbon particles produced by friction of a protective layer, thus preventing the increase in a contact area of a magnetic head during using the magnetic disk and also preventing the enhancement of friction coefficient.

Also, when using the substrate having the first material packed in a group into pores of an anodized layer of an aluminium alloy by means of electrolytic deposition and having the second material packed in a group by means of dipping method, the protrusions having a larger protrusion length obtained after polishing and etching are present in a group, thus provided advantages that damages by headhits can be prevented and that the occurrence rate of head crushes can be lowered.

Furthermore, when the protrusion length of the first group is made from 5 to 20 nm by etching and the protrusion length of the second group is made from 1 to 15 nm, the magnetic properties and the CSS properties are more improved than using the conventional substrate prepared by the known CTX method.

Also, according to the process of the present invention, materials having different etching rates can be easily packed in a uniform distribution into the alumite pores of an aluminum alloy by combining electrolytic deposition and dipping steps. Moreover, a macro-concavo-convex pattern and a micro-concavo-convex pattern can be formed at the same time by polishing the surface and etching under the predetermined treating conditions, thereby producing DCTX (double chemical texture) having the macro-concavo-convex pattern and the micro-concavo-convex pattern by relatively simple treating steps. Furthermore, since the maximum protrusion height is defined by the polished surface, the protruded parts cut by a banishing step are little and the protective layer is not substantially damaged, thus improving corrosion resistance.

What is claimed is:

1. A substrate for a magnetic recording medium, utilizing, as a texture, protrusions different in length from the substrate surface, of materials packed in pores of an anodized aluminum layer, said protrusions being formed by packing the pores of the anodized aluminum layer with at least two materials differing in the etching rate, followed by polishing and then by etching.

2. The substrate for the magnetic recording medium according to claim 1, wherein one of the at least two materials differing in the etching rate is Cu.

3. The substrate for the magnetic recording medium according to claim 1, wherein one of the at least two materials differing in the etching rate is Sn.

4. The substrate for the magnetic recording medium according to claim 1, wherein one of the at least two materials differing in the etching rate is Zn.

5. The substrate for the magnetic recording medium according to claim 1, wherein one of the at least two materials differing in the etching rate is an organic resin.

6. The substrate for the magnetic recording medium according to claim 1, wherein one of the at least two materials differing in the etching rate is an inorganic ceramic.

7. The substrate for the magnetic recording medium according to claim 1, wherein the first material is packed in a group by electrolytic deposition into pores of the anodized aluminum layer of an aluminum alloy used as the substrate, and the second material is packed in a group by dipping method into the pores remained without being packed with the first material by the electrolytic deposition due to the presence of inclusions in the aluminum alloy.

8. The substrate for the magnetic recording medium according to claim 7, wherein the protrusion length of the first material group after etching is from 5 to 20 nm and the protrusion length of the second material group after etching is from 1 to 15 nm.

9. The substrate for the magnetic recording medium according to claim 1, wherein one of the at least two materials differing in the etching rate is selected from the group consisting of Cu, Sn and Zn, and another one of the at least two materials differing in etching rate is selected from the group consisting of an organic resin and an inorganic ceramic.

10. The substrate for the magnetic recording medium according to claim 9, wherein one of the at least two materials differing in etching rate is an organic resin.

11. The substrate for the magnetic recording medium according to claim 9, wherein one of the at least two materials differing in the etching rate is an inorganic resin.

12. A process of producing a substrate for a magnetic recording medium, which comprises the steps of (i) packing a first material into pores of the anodized aluminum layer of an aluminum alloy by electrolytic deposition, (ii) packing the remaining pores of the anodized aluminum layer of the aluminum alloy by dipping method with a second material having an etching rate different from that of the first material, (iii) polishing the surface, and (iv) etching the first and the second materials so as to obtain a predetermined protrusion length.

13. The process of producing the substrate for the magnetic recording medium according to claim 12, wherein the first material packed by electrolytic deposition is selected from the group consisting of Cu, Sn and Zn, and the second material packed by dipping method is selected from the group consisting of an organic resin and an inorganic ceramic.

14. The process of producing the substrate for the magnetic recording medium according to claim 13, wherein the first material packed by electrolytic deposition is Cu.

15. The process of producing the substrate for the magnetic recording medium according to claim 13, wherein the first material packed by electrolytic deposition is Sn.

16. The process of producing the substrate for the magnetic recording medium according to claim 13, wherein the first material packed by electrolytic deposition is Zn.

17. The process of producing the substrate for the magnetic recording medium according to claim 13, wherein the second material packed by dipping method is an organic resin.

18. The process of producing the substrate for the magnetic recording medium according to claim 13, wherein the second material packed by dipping method is an inorganic ceramic.

* * * * *